United States Patent [19]
Kim

[11] Patent Number: 6,025,891
[45] Date of Patent: Feb. 15, 2000

[54] LIQUID CRYSTAL DISPLAY DEVICE

[75] Inventor: Jeom Jae Kim, Seoul, Rep. of Korea

[73] Assignee: LG Electronics Inc., Seoul, Rep. of Korea

[21] Appl. No.: 08/969,367

[22] Filed: Nov. 28, 1997

[30] Foreign Application Priority Data

Nov. 29, 1996 [KR] Rep. of Korea ...................... 96-59212

[51] Int. Cl.[7] ........................... G02F 1/1333; G02F 1/136
[52] U.S. Cl. ............................................... 349/40; 349/41
[58] Field of Search ........................................ 349/40, 41

[56] References Cited

U.S. PATENT DOCUMENTS

| | | | |
|---|---|---|---|
| 5,041,822 | 8/1991 | Hayashi ..................................... | 349/40 |
| 5,200,876 | 4/1993 | Takeda et al. ............................ | 349/40 |
| 5,233,448 | 8/1993 | Wu ........................................... | 349/40 |
| 5,323,254 | 6/1994 | Pitt ............................................ | 349/40 |
| 5,504,348 | 4/1996 | Yoshida et al. ........................... | 257/59 |
| 5,666,131 | 7/1997 | Togashi .................................... | 345/91 |
| 5,668,032 | 9/1997 | Holmberg et al. ....................... | 349/40 |
| 5,684,546 | 11/1997 | Kim ......................................... | 349/40 |
| 5,748,267 | 5/1998 | Natori et al. .............................. | 349/40 |
| 5,767,929 | 6/1998 | Yachi et al. .............................. | 349/40 |
| 5,781,253 | 7/1998 | Koike et al. .............................. | 349/40 |

*Primary Examiner*—William L. Sikes
*Assistant Examiner*—Tarifur R. Chowdhury
*Attorney, Agent, or Firm*—Morgan, Lewis & Bockius LLP

[57] ABSTRACT

A liquid crystal display device includes a plurality of gate lines and a plurality of data lines substantially perpendicular to the gate lines, first and second shorting bars formed respectively in a gate driving IC mounting region and a data driving IC mounting region. A plurality of switching devices are formed between the first shorting bar and respective pad of the gate lines and between the second shorting bar and respective pad of the data lines.

15 Claims, 11 Drawing Sheets

LIQUID CRYSTAL DISPLAY DEVICE

This application claims the benefit of Korean Patent Application No. 59212/1996 filed Nov. 29, 1996, which is hereby incorporated by reference.

BACKGROUND OF THE INVENTION

1. Field of the Invention

The present invention relates to a liquid crystal display (LCD) device, and more particularly, to a liquid crystal display device for mounting a chip on glass (COG) to facilitate an array check.

2. Discussion of the Related Art

Generally, many methods for Amounting a driving integrated circuit (IC) exist which provide a signal for driving an LCD device. Such methods include the wire bonding (WB) type, the tape automated bonding (TAB) type, and the COG-type.

The WB type method connects a panel electrode with a driving IC using Au wire. The TAB-type method mounts a package on a panel, in which a driving IC is connected to a film carrier. The COG-type method mounts a bump formed on a bare chip for a panel having an inner lead pad and an outer lead pad.

During the process steps of forming an LCD device, electrostatic discharge occurs in an internal TFT-LCD array, which destrcoys internal devices, such as a thin film transistor. For this reason, a shorting bar has been used to prevent the internal devices from being destroyed by the electrostatic discharge and facilitate array checking after forming an array region of a TFT-LCD.

In general, a first shorting bar is connected to respective gate lines and a second shorting bar is connected with respective data lines. A power source is applied to the shorting bar bar connected to the gate lines to check for open lines at end of the respective gate lines opposite to the shorting bar when performing a continuity check of the array. A similar technique is also applied to the data lines.

The shorting bar is not actually used in driving the TFT-LCD. The shorting bar is removed once it has performed the functions of protecting the TFT-LCD from electrostatic discharge and checking the array for continuity. In other words, if the array continuity check is successful after forming the TFT-LCD array, a top plate of the TFT-LCD and a bottom plate thereof are bonded to each other. The shorting bar is removed by a scribe and a grinding process.

Meanwhile, the respective gate lines and the respective data lines have different configurations from each other depending on the method utilized for mounting the driving IC, which causes difficulty in forming the shorting bar. In the TAB-type method for mounting a driving IC, the carrier film is connected to both sides of a bare chip so that a space on the TFT-LCD panel is ensured. In this case, a shorting bar is formed at one side of each of a gate line pad and a data line pad, which serves as driving IC mounting regions. In the COG-type mounting method, the inner lead and the outer Icad should be formed within the driving IC mounting region of the TFT-LCD panel, because it is difficult to ensure a space on the TFT-LCD panel, thereby causing difficulty in forming a shorting bar in the driving IC mounting region. To overcome the above-mentioned shortcoming, a method for mounting a shorting bar using the COG-type mounting method has been recently developed.

A conventional method for mounting a shorting bar in an LCD device employing the COG-type mounting method will be described with reference to FIG. 1, which is a schematic layout illustrating a conventional LCD device employing a COG-type mounting method.

Figure 1:
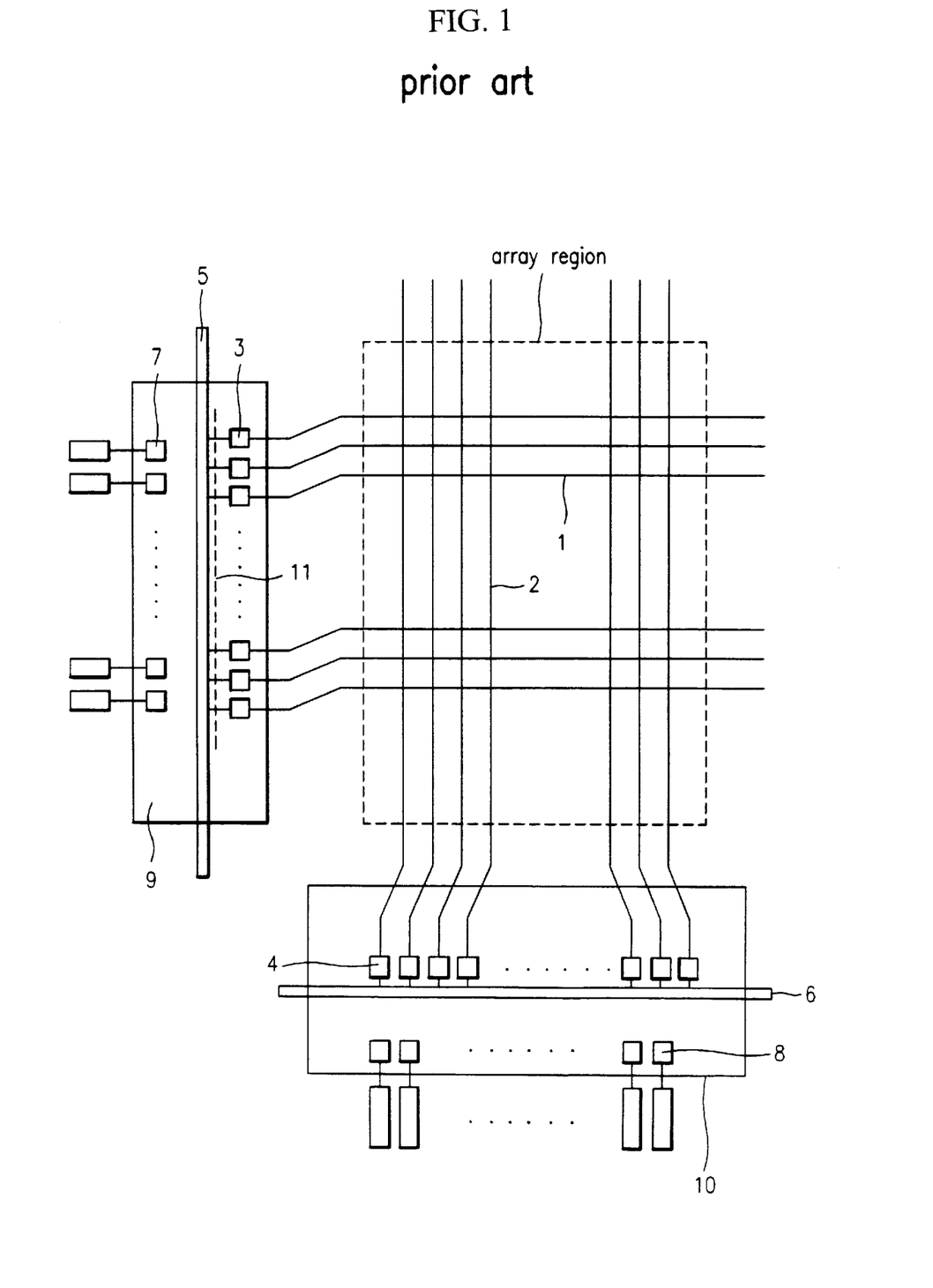
FIG. 1 is a schematic layout illustrating a conventional LCD device employing a COG-type mounting method.

As illustrated in FIG. 1, a plurality of gate lines 1 are formed on a substrate in one direction at a predetermined interval and a plurality of data lines 2 are formed in a direction perpendicular to the gate lines 1 at a predetermined interval. Gate line pads 3 and data line pads 4 are respectively formed at one end of each of the respective gate lines 1 and data lines 2. A plurality of gate input pads 7 are formed at a predetermined interval opposite the gate line pads 3. A plurality of data input pads 8 are formed at a predetermined interval opposite the data line pads 4.

A gate driving IC mounting region 9 includes the gate line pads 3 and the gate input pads 7. A data driving IC mounting regior 10 includes the data line pads 4 and the data input pads 8. In these driving IC mounting regions 9 and 10, first and second shorting bars 5 and 6 are formed, respectively. The first shorting bar 5 is formed between the respective gate line pads 3 and the respective gate input pads 7. The respective gate line pads 3 are connected to the first shorting bar 5. The second shorting bar 6 is formed between the respective data line pads 4 and the respective data input pads 8. The respective data line pads 4 are connected to the second shorting bar 6.

In FIG. 1, reference numeral 11, which is not described, represents a laser cutting line.

A TFT-LCD having thin film transistors and pixel electrodes is formed and the array continuity check is performed. A top plate of the TFT-LCD and a bottom plate thereof are then adhered to each other and the shorting bars 5 and 6 are severed from the gate line pads 3 and the data line pads 4 using a laser cutting equipment.

However, the conventional LCD device employing the COG-type mounting method has a disadvantage in that the cost of production increases due to the shorting bar being severed from the respective gate or data line pads using expensive laser cutting equipment.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device for facilitating array continuity checking.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a liquid crystal display device according to the present invention includes a plurality of gate lines and a plurality of data lines perpendicular to the gate lines, first and second shorting bars formed respectively in a gate driving IC mounting region and a data driving IC mounting region, and a plurality of switching devices formed between the first shorting bar and respective pads of each of the gate lines and between the second shorting bar and respective pad of each of the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6(a)–6(d) illustrates the manufacturing steps of the shorting bar region, for the gate lines, and the TFT-LCD represented in FIGS. 4 and 5 of the present invention;

DETAILED DESCRIPTIODN OF THE PREFERRED EMBODIMENTS

Reference will now be made in detail to the preferred embodiments of the present invention, examples of which are illustrated in the accompanying drawings.

Figure 2:
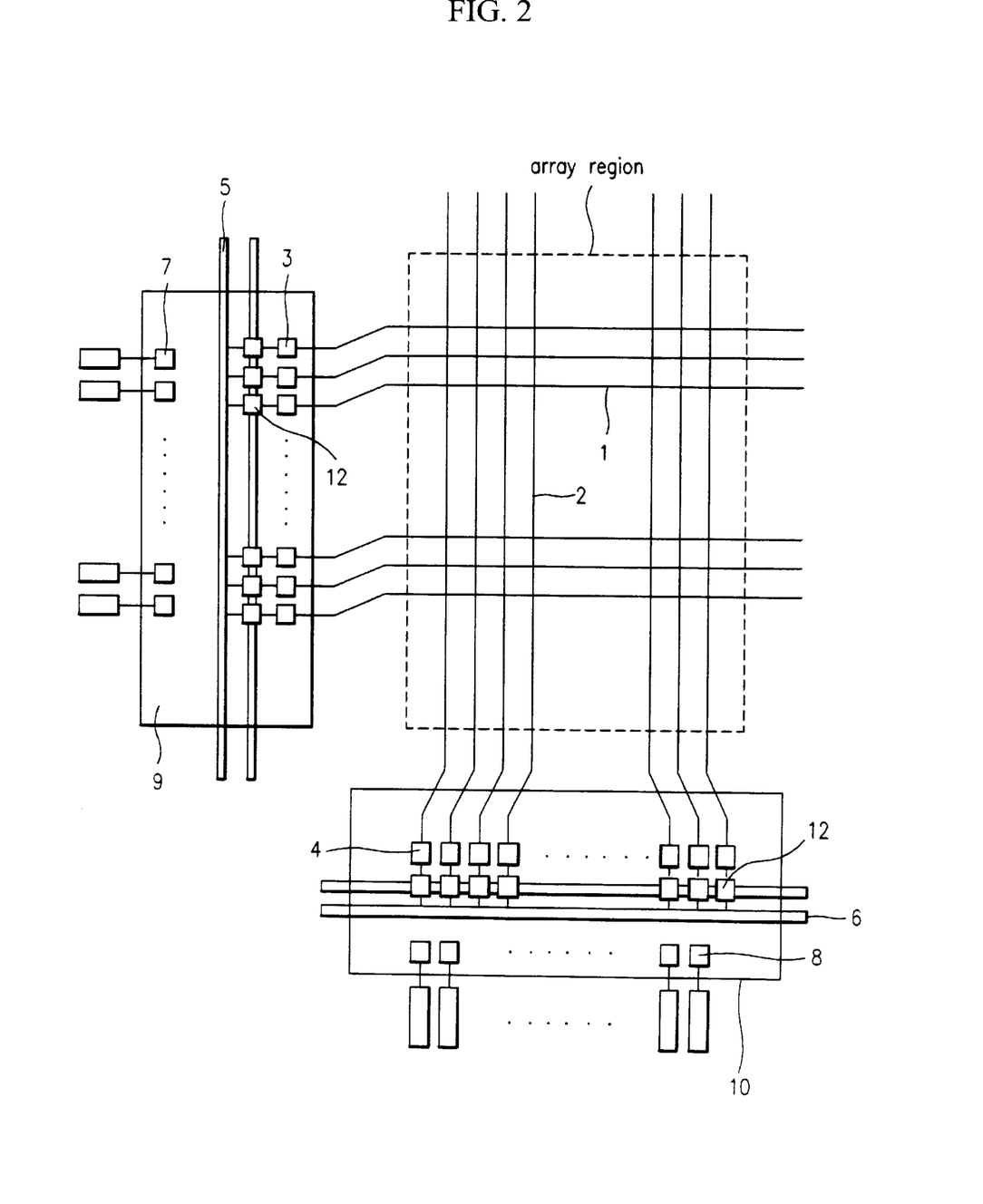
FIG. 2 is a schematic layout illustrating a LCD device employing a COG-type mounting method.

As illustrated in FIG. 2, a plurality of gate lines 1 are formed on a substrate in one direction at a predetermined interval and a plurality of data lines 2 are formed perpendicularly to the gate lines 1 at a predetermined interval.

Gate line pads 3 and data line pads 4 are formed at one of the ends of the gate lines 1 and the data lines 2, respectively. A plurality of gate input pads 7 are formed at predetermined intervals to oppose the gate line pads 3. A plurality of data input pads 8 are formed at predetermined intervals to oppose the data line pads 4.

A gate driving IC mounting region 9 includes the gate line pads 3 and the gate input pads 7. A data driving IC mounting region 10 includes the data line pads 4 and the data input pads 8. In driving IC mounting regions 9 and 10, first and second shorting bars 5 and 6 are respectively formed.

The first shorting bar 5 and each of the respective gate line pads 3 are connected with each other by switching devices 12. The second shorting bar 6 and each of the respective data line pads 4 are connected with each other by switching devices 12.

In other words, the first shorting bar 5 is formed between each of the respective gate line pads 3 and the respective gate input pads 7. Each of the respective gate line pads 3 is then connected to the first shorting bar 5 through the switching device 12. The second shorting bar 6 is formed between each of the respective data line pads 4 and the data input pads 8. The respective data line pad 4 is connected to the second shorting bar 6 through the switching device 12, wherein the respective switching device 12 is turned on/off by an external signal.

Figure 3A:
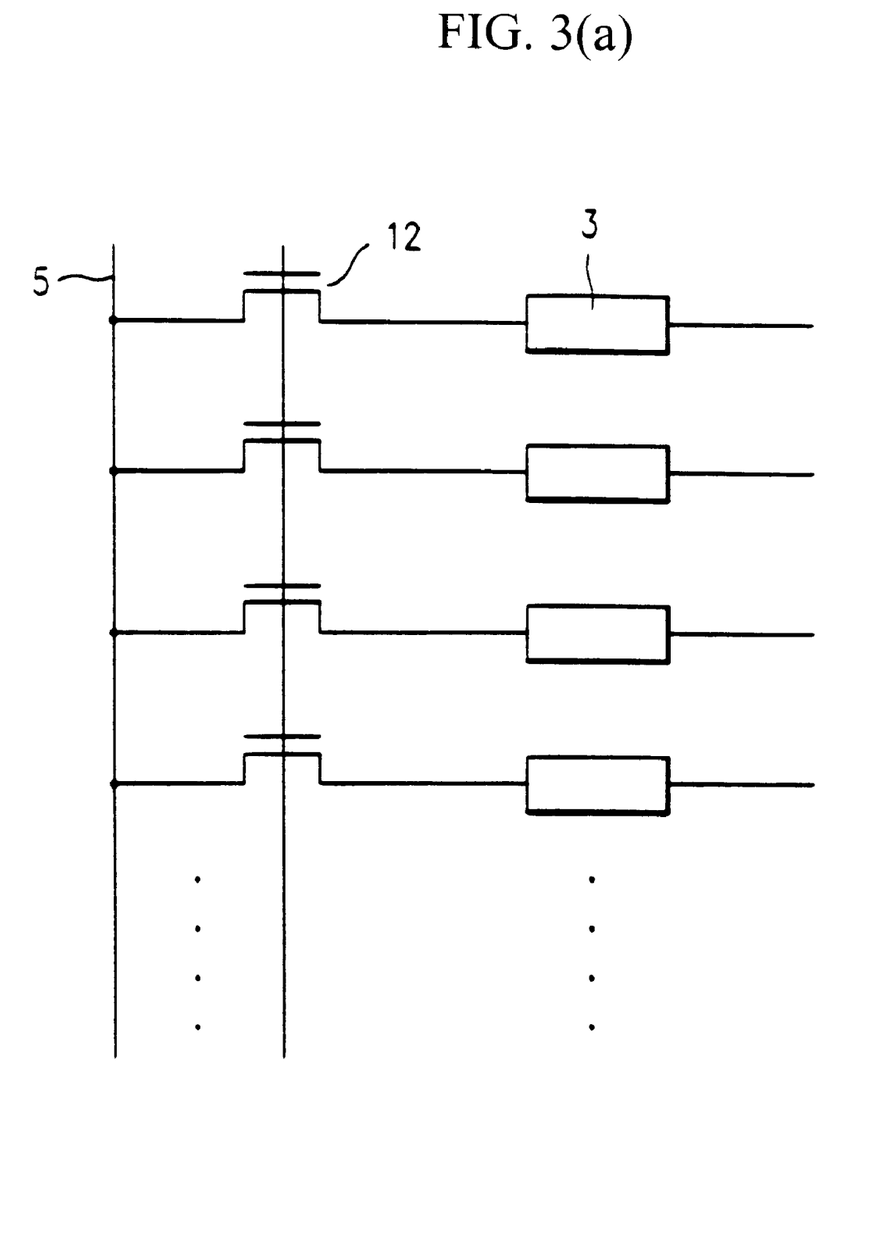
FIGS. 3(a) and 3(b) are schematic layouts illustrating switching devices for the respective gate and data line regions according to the first embodiment of the present invention.
Figure 3B:
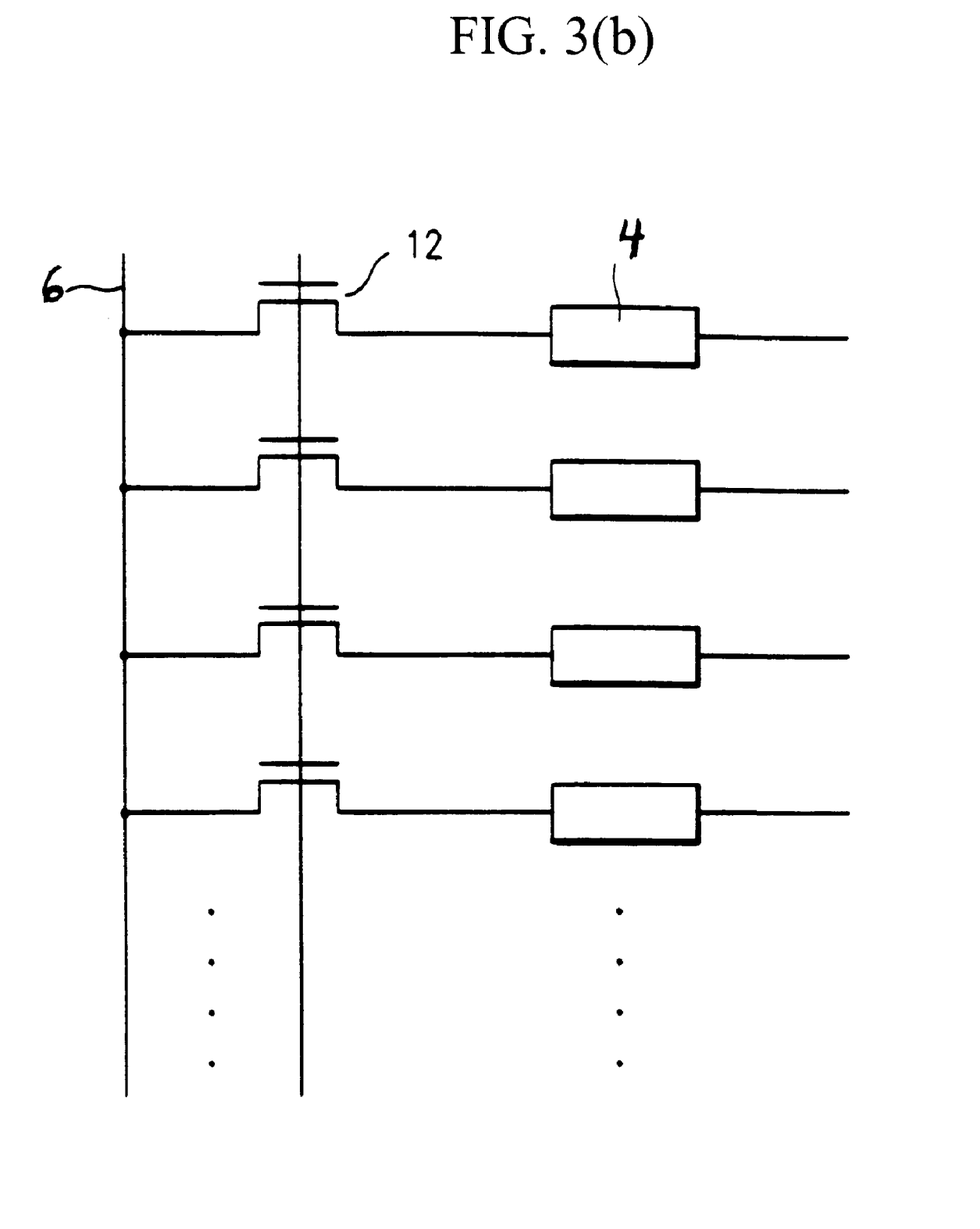
Figure 4:
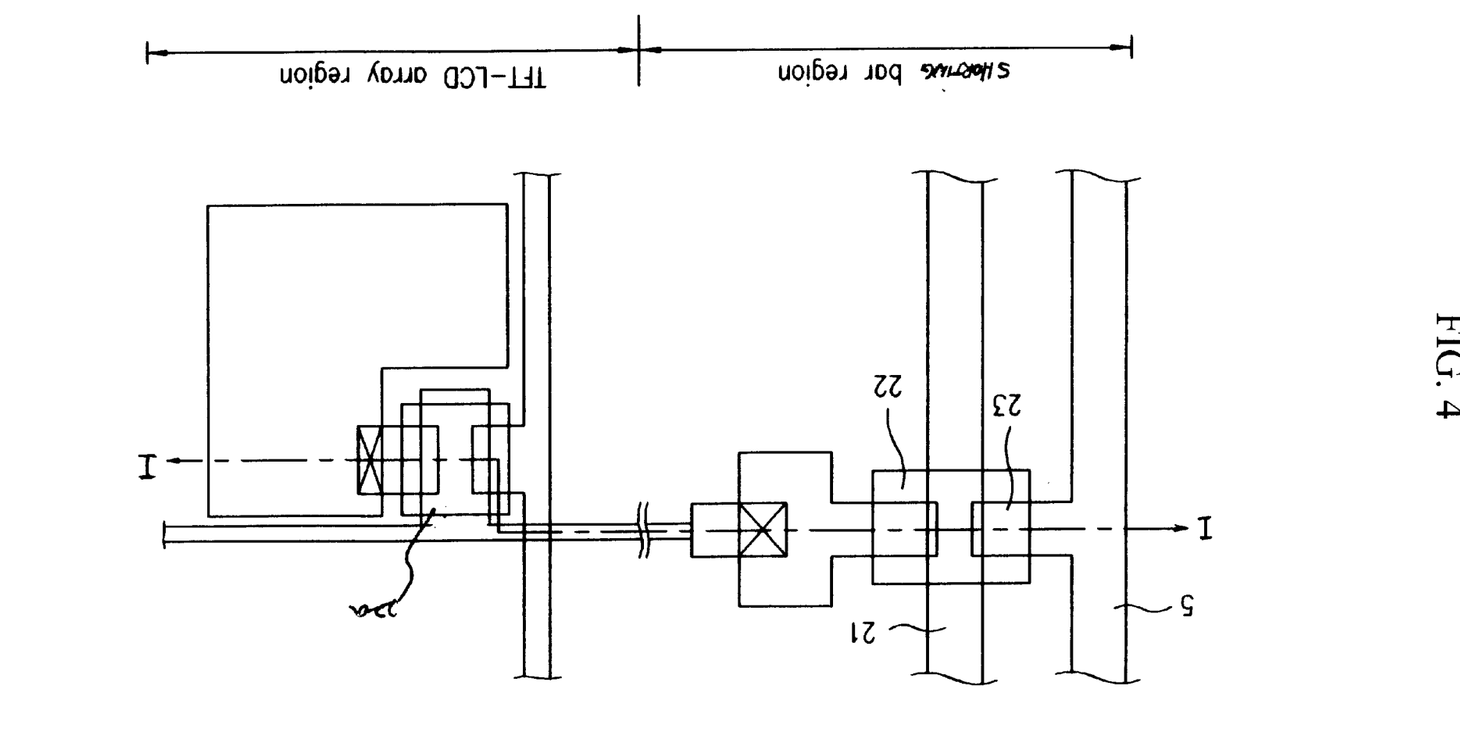
FIG. 4 is a schematic layout illustrating a shorting bar region and a TFT-LCD region according to the first embodiment of the present invention.
Figure 5:
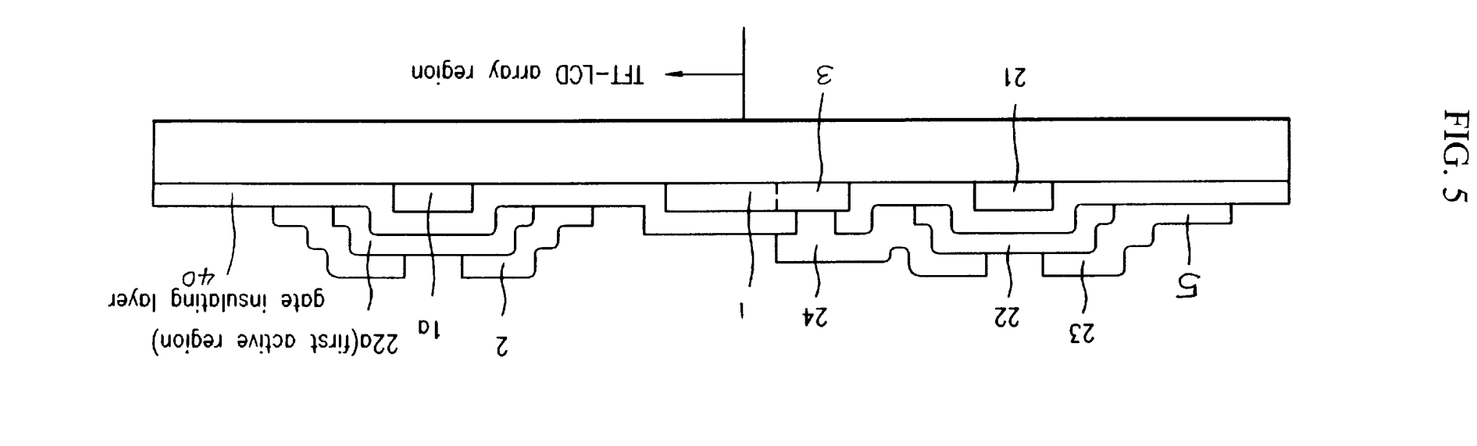
FIG. 5 is a sectional view along line I—I of FIG. 4 of the shorting bar region, for the gate lines, and the TFT-LCD region of the present invention.
Figure 6:
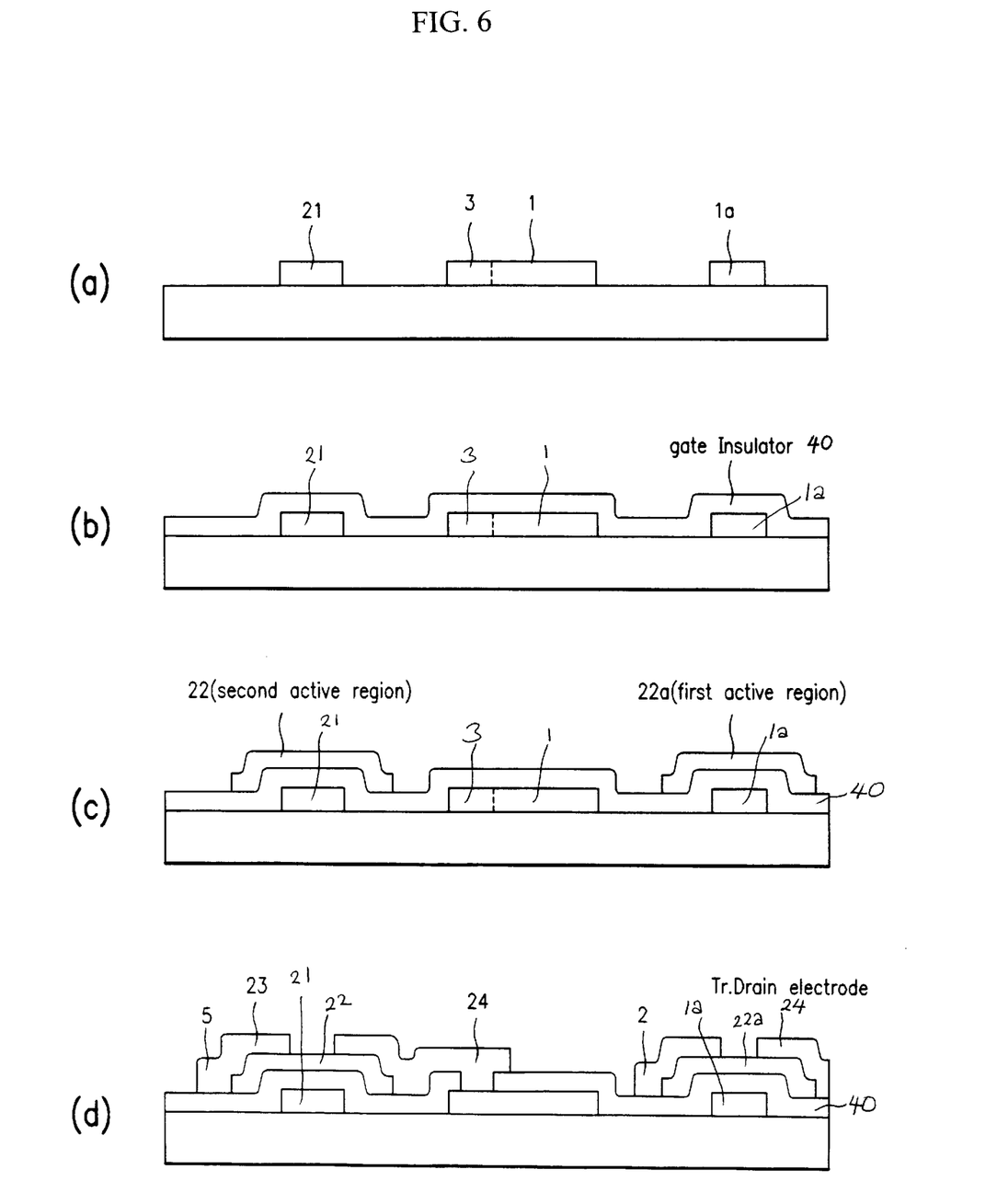

The switching device of the aforementioned LCD device employing a COG-type mounting method according to the first embodiment of the present invention will now be described in detail with reference to FIG. 3–FIG. 6. In the first embodiment of the present invention, a transistor, as shown in FIGS. 3(a) and 3(b), is used as the switching device, which is formed in the same manner as the process steps of forming a TFT-LCD cell.

In the gate driving IC mounting region 9, a metal is deposited on a glass substrate and selectively removed to form gate lines 1 and a gate line pads 3 of a TFT-LCD, and at the same time a gate electrode 21, of a switching device 12, is formed which connects the shorting bar 5 with the gate line pad 3. A gate insulating film 40 is then formed on the entire surface of the substrate.

As shown in FIGS. 4, 5, and 6(a)–6(d), a semiconductor layer is next formed on the gate insulating film 40 and selectively removed to form an island shaped first active layer 22a, above the gate electrode 1a (FIG. 5) in the respective thin film transistor region of a TFT-LCD array region. A second active layer is concurrently formed on the gate insulating layer 40 above gate electrode 21 and the island shaped active region 22 is formed in the switching device region. A metal is then deposited on the entire surface of the substrate and selectively removed to form data lines 2 and data pads 4 (FIG. 3b), in the TFT-LCD array region and a source electrode 23 a drain electrode 24, of the switching device 12, and a first shorting bar 5 are concurrently formed in the switching device region. Furthermore, the source electrode 23 and the first shorting bar 5 are preferably integrally and concurrently formed and the drain electrode 24 is formed to be in contact with the gate line pads 3.

The data driving IC mounting region 10 has a similar construction as the gate driving IC mounting region 9. That is the shorting bar 6 and the data electrode 21 a of the switching device 12 are formed together with the data lines 2 and the data line pads 4 of the TFT-LCD array region. The source electrode 23 and the drain electrode 24, of the switching device 12, and the gate lines 3 are formed concurrently and the source electrode 23 is in contact with the second shorting bar 6. The drain electrode 24 and the data line pads 4 are preferably integrally formed.

Figure 7A:
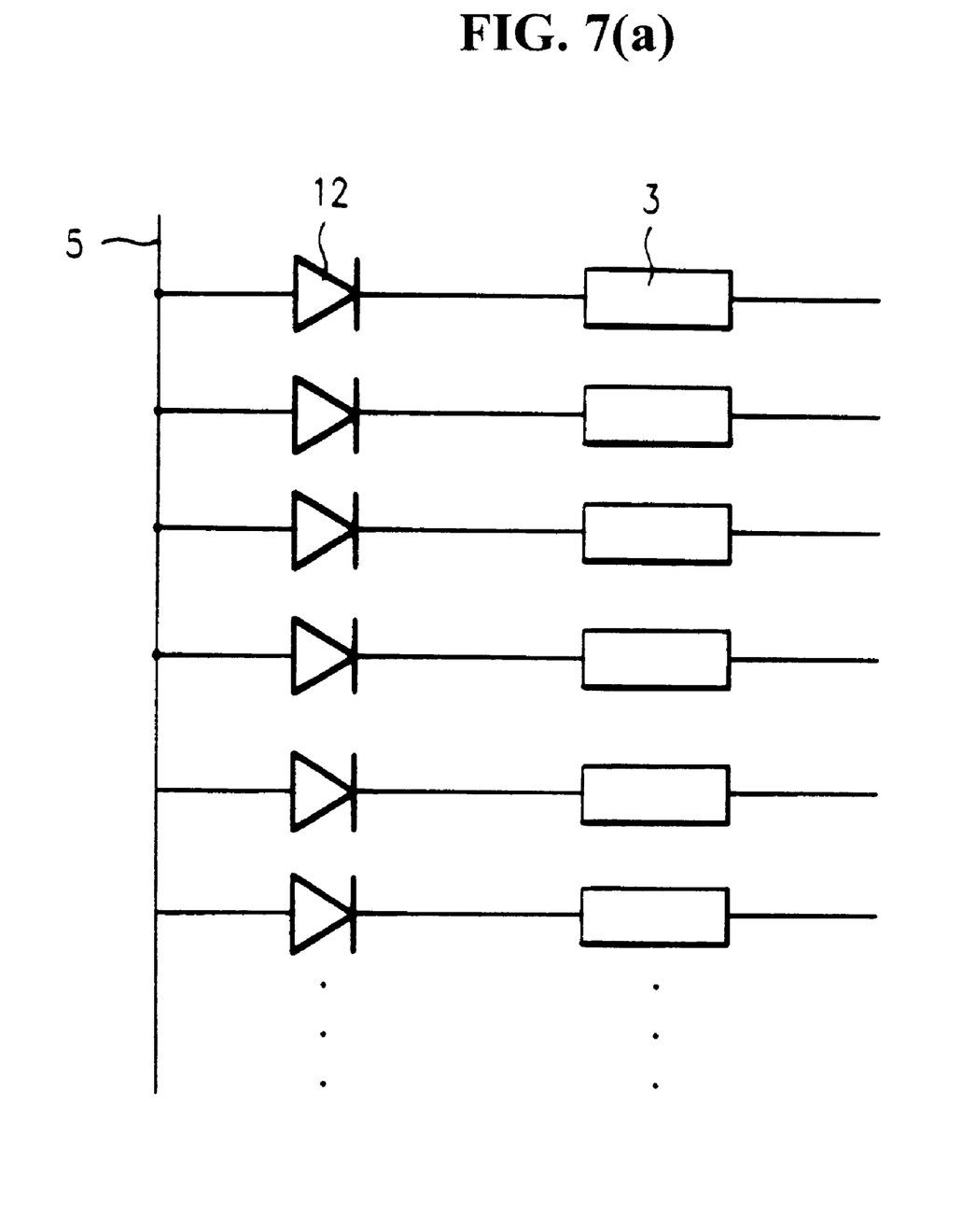
FIGS. 7(a) and 7(b) are schematic layouts illustrating switching devices for the respective gate and data lines according to the second embodiment of the present invention.
Figure 7B:
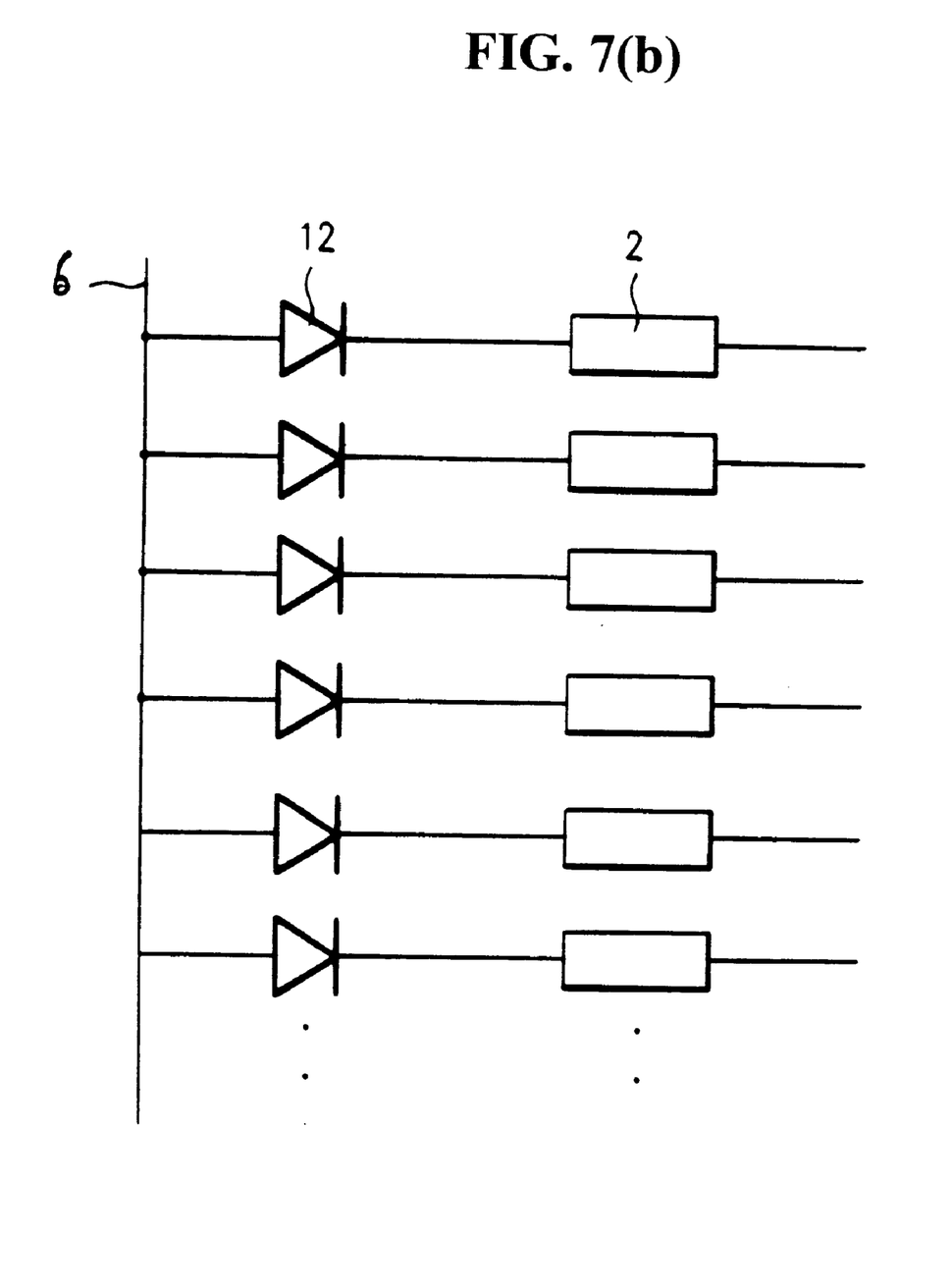
Figure 8A:
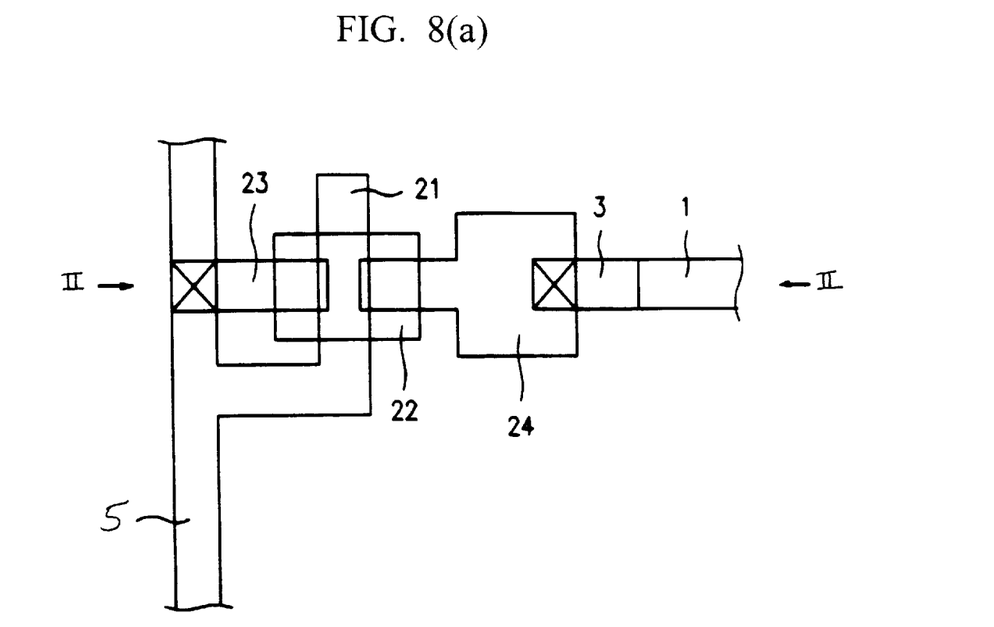
FIG. 8(a) is a schematic layout illustrating a shorting bar region and a TFT-LCD region according to the second embodiment of the present invention.
Figure 8B:
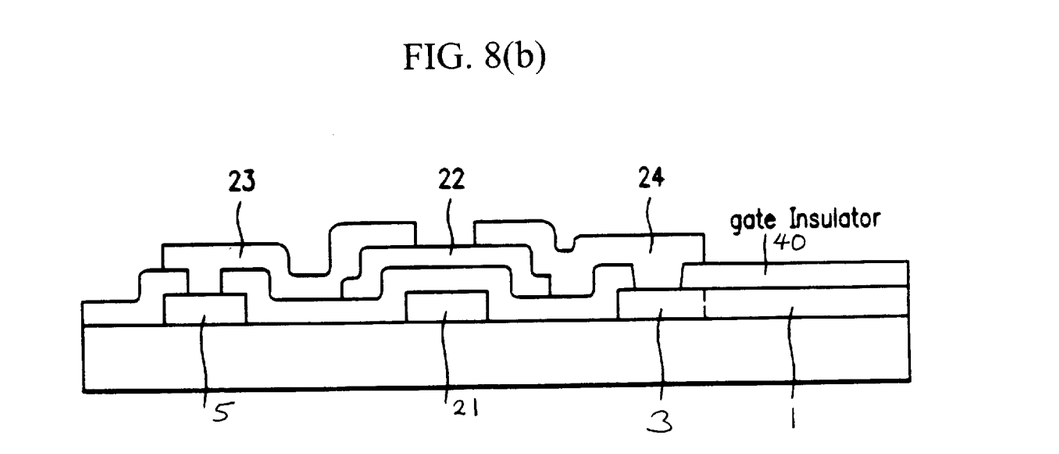
FIG. 8(b) is a sectional view along line II—II of FIG. 8(a) of the shorting bar region, for the gate lines, and the TFT-LCD region of the present invention.

The switching device of the aforementioned LCD device employing a COG-type mounting method, according to the second embodiment of the present invention, will now be described in detail with reference to FIGS. 8(a) and 8(b). In the second embodiment of the present invention, a diode, as shown in FIGS. 7(a) and 7(b), is used as the switching device 12, which is formed in a similar manner as the process steps for forming a TFT-LCD cell.

In the gate driving IC mounting region 9, a metal is deposited on a glass substrate and selectively removed to form gate lines 1 and gate line pads 3 of a TFT-LCD. A first shorting bar 5 and a gate electrode 21 of the switching device 12 are concurrently formed. The gate electrode 21 of the switching device 12 and the first shorting bar 5 are preferably integrally formed.

A gate insulating film 40 is then formed on the entire surface of the substrate. A semiconductor layer is next formed on the gate insulating film and selectively removed to form a first active layer 22a in the respective thin film transistor region of TFT-LCD array region. Concurrently, a second active layer 22 is formed on the gate insulating film 40, above the gate electrode 21, in a region for forming the switching device 12. A metal is then deposited on the entire surface of the substrate and selectively removed to form a gate line 1 and a gate pad 3 in the TFT-LCD array region. A source electrode 23 of the switching device 12 and a drain electrode 24 thereof are formed concurrently in the switching device region. The source electrode 23 is formed in contact with the first shorting bar 5 and the drain electrode 24 is in contact with each of the respective gate pads 3.

With respect to the data driving IC mounting region 10, it is formed in substantially the same manner with substantially the same structure as the gate driving IC mounting region 9. The gate electrode 21 of the switching deviice 12 and the second shorting bar 6 are formed together with the data line 2 and the data line pad 4 of the TFT-LCD array region. The source electrode 23 and the drain electrode 24 of the switching device 12 are formed concurrently. The second shorting bar 6 and the data electrode 21a are then integrally formed at this time. The source electrode 23 is in contact with the second shorting bar 6. The drain electrode 24 and the data line 2 are integrally formed.

Figure 9A:
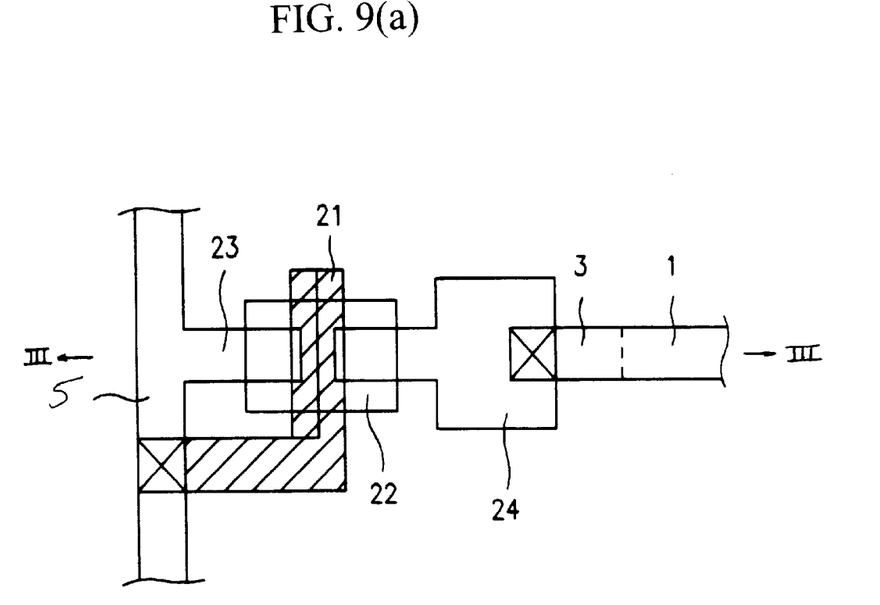
FIG. 9(a) is a schematic layout illustrating a shorting bar region and a TFT-LCD region according to the third embodiment of the present invention.
Figure 9B:
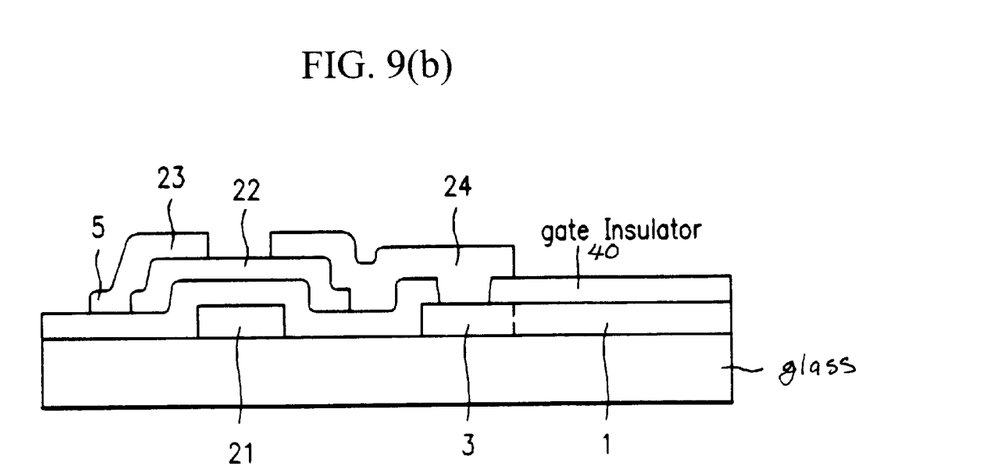
FIG. 9(b) is a sectional view along line II—II of FIG. 9(a) of the shorting bar region, for the gate lines, and the TFT-LCD region of the present invention.

The switching device of the aforementioned LCD device employing a COG-type mounting method, according to the third embodiment of the present invention, will now be described in detail with reference to FIGS. 9(a) and 9(b). In the third embodiment of the present invention, a diode, as shown in FIGS. 7(a) and 7(b), is used as the switching device 12, which is formed in the same manner as the process steps for forming a TFT-LCD cell.

In the gate driving IC mounting region 9, a metal is deposited on a glass substrate and selectively removed to form gate lines 1 and gate line pads 3 of a TFT-LCD. The source electrode 23 of the switching device 12 and the first shorting bar 5 are preferably integrally formed.

A gate insulating film 40 is then formed on the entire surface of the substrate. A semiconductor layer is next formed on the gate insulating film and selectively removed to form a first active layer 22a in the respective thin film transistor region of TFT-LCD array region. Concurrently, a second active layer 22 is formed on the gate insulating film 40, above the gate electrode 21, in a region for forming the switching device 12. A metal is then deposited on the entire surface of the substrate and selectively removed to form a gate line 1 and a gate pad 3 in the TFT-LCD array region. A source electrode 23 of the switching device 12 and a drain electrode 24 thereof are formed concurrently in the switching device region. The source electrode 23 is formed in contact with the first shorting bar 5 and the drain electrode 24 is in contact with each of the respective gate pads 3. The shorting bar 6 and the source electrode 23 are preferably integrally formed.

With respect to the data driving IC mounting region 10, it is formed in substantially the same manner with substantially the same structure as the gate driving IC mounting region 9. The gate electrode 21 of the switching device 12 and the second shorting bar 6 are formed together with the data line 2 and the data line pad 4 of the TFT-LCD array region. The source electrode 23 and the drain electrode 24 of the switching device 12 are formed concurrently. The source electrode 23 is in contact with the second shorting bar 6 and preferably formed integrally. The drain electrode 24 and the data line 2 are integrally formed.

An array check of the aforementioned LCD device employing a COG-type mounting method of the present invention is performed as follows. In the embodiment where the transistor is used as the switching device, in the same manner as in the first embodiment of the present invention, a high voltage greater than a threshold voltage of the transistor is applied to the gate electrode 21 of the switching device 12 for the array continuity check. Once the switching device is turned on, the array check is performed in the conventional manner.

After the LCD device is completed, the power source is disconnected from the shorting bar so that the transistor cannot be operated. Since the shorting bar and the input pads are connected to the active layer which has a high resistance, it is not necessary to additionally remove the shorting bar.

In the case where a diode is used as the switching device, in the same manner as the second embodiment and third embodiments of the present invention, the power source is applied to the respective lines in accordance with the forward characteristic of the diode after applying the power source to the shorting bar. The array continuity check is then performed in the same manner as in the conventional method. After the LCD device is completed, the power source is disconnected from the shorting bar.

The COG-type LCD device according to the present invention has the following advantages. The shorting bar is mounted in the driving IC mounting region and the switching device is mounted between the shorting bar and each of the respective pads. The shorting bar is connected to or cut off from the pad using the switching device as occasion demands so as to facilitate an array continuity check. Since a laser cutting process is not required, the overall process is simplified and expensive laser cutting equipment is not required.

It will be apparent to those skilled in the art that various modifications and variations can be made in the liquid crystal display device according to the present invention without departing from the spirit or scope of the invention. Thus, it is intended that the present invention cover the modifications and variations of the invention provided they come within the scope of the appended claims and their equivalents.

What is claimed is:

1. A liquid crystal display device comprising:
   a plurality of first lines and a plurality of second lines substantially perpendicular to the first lines, wherein a first line refers to one of a gate line and a data line, and a second line refers to the other one of the gate line and the data line;
   a plurality of first line pads, each having a first side connected to a respective one of the first lines;
   a first shorting bar; and
   a plurality of first switching devices, each coupled between the first shorting bar and a second side of a respective one of the first line pads.

2. The liquid crystal display device of claim 1, wherein the first switching devices include diodes.

3. The liquid crystal display device of claim 2, wherein each of the respective diodes has a transistor structure including a source electrode and a gate electrode commonly connected to the first shorting bar.

4. The liquid crystal display device of claim 1, wherein the first switching devices include transistors.

5. The liquid crystal display device of claim 4, further including one or more signal lines that simultaneously control the transistors.

6. The liquid crystal display device of claim 1, wherein the first switching devices include diodes and transistors.

7. The liquid crystal display device of claim 6, wherein each of the diodes has a transistor structure including a source electrode and a gate electrode commonly connected to the first shorting bar.

8. The liquid crystal display device of claim 6, further including one or more signal lines that simultaneously control the transistors.

9. The liquid crystal display device of claim 1, further comprising:
   a plurality of second line pads, each having a first side connected to a respective one of the second lines;
   a second shorting bar; and
   a plurality of second switching devices, each coupled between the second shorting bar and a second side of a respective one of the second line pads.

10. The liquid crystal display device of claim 9, further including a first driving IC mounting region and a second driving IC mounting region, the first and second shorting bars being respectively formed in the first and second driving IC mounting regions.

11. A liquid crystal display device comprising:
    a plurality of gate lines and a plurality of data lines;
    a first and second shorting bars;
    a plurality of first switching devices connected to the first shorting bar;
    a plurality of second switching devices connected to the second shorting bar;
    a plurality of gate line pads coupled between the first switching devices and the gate lines; and
    a plurality of data line pads coupled between the second switching devices and the data lines.

12. The liquid crystal displace device of claim 11, wherein the first and second switching devices include diodes.

13. The liquid crystal display device of claim 11, wherein the first and second switching devices include transistors.

14. The liquid crystal display device of claim 11, wherein the first and second switching devices include diodes and transistors.

15. The liquid crystal display device of claim 11, further comprising:
    a gate driving IC mounting region having a plurality of gate input pads and the gate line pads; and
    a data driving IC mounting region having a plurality of data input pads and the data line pads.

* * * * *